(12) United States Patent
Nemavat et al.

(10) Patent No.: US 9,066,369 B1
(45) Date of Patent: Jun. 23, 2015

(54) COEXISTING RADIO COMMUNICATION

(75) Inventors: Pradeep Jugraj Nemavat, Maharashtra (IN); Sandesh Goel, Noida (IN)

(73) Assignee: Marvell International Ltd., Hamilton (BM)

( * ) Notice: Subject to any disclaimer, the term of this patent is extended or adjusted under 35 U.S.C. 154(b) by 1081 days.

(21) Appl. No.: 12/883,054

(22) Filed: Sep. 15, 2010

Related U.S. Application Data

(60) Provisional application No. 61/243,069, filed on Sep. 16, 2009, provisional application No. 61/243,080, filed on Sep. 16, 2009.

(51) Int. Cl.
*H04W 88/06* (2009.01)

(52) U.S. Cl.
CPC .................................. *H04W 88/06* (2013.01)

(58) Field of Classification Search
CPC .. H04W 88/06; H04W 72/1215; H04W 28/04
See application file for complete search history.

(56) References Cited

U.S. PATENT DOCUMENTS

| | | | |
|---|---|---|---|
| 4,337,463 A | 6/1982 | Vangen | |
| 4,366,350 A | 12/1982 | Lee et al. | |
| 4,385,384 A | 5/1983 | Rosbury et al. | |
| 4,805,215 A | 2/1989 | Miller | |
| 5,347,234 A | 9/1994 | Gersbach et al. | |
| 5,634,207 A | 5/1997 | Yamaji et al. | |
| 5,673,291 A | 9/1997 | Dent | |
| 5,708,656 A | 1/1998 | Noneman et al. | |
| 5,847,616 A | 12/1998 | Ng et al. | |
| 5,995,819 A | 11/1999 | Yamaji et al. | |
| 6,035,210 A | 3/2000 | Endo et al. | |
| 6,167,245 A | 12/2000 | Welland et al. | |
| 6,285,262 B1 | 9/2001 | Kuriyama | |
| 6,320,919 B1 | 11/2001 | Khayrallah et al. | |
| 6,347,091 B1 | 2/2002 | Wallentin et al. | |
| 6,366,622 B1 | 4/2002 | Brown et al. | |
| 6,374,117 B1 | 4/2002 | Denkert et al. | |
| 6,438,364 B1 | 8/2002 | Waite | |
| 6,452,458 B1 | 9/2002 | Tanimoto | |
| 6,509,777 B2 | 1/2003 | Razavi et al. | |
| 6,519,461 B1 | 2/2003 | Andersson et al. | |
| 6,535,037 B2 | 3/2003 | Maligeorgos | |
| 6,553,229 B1 | 4/2003 | Dent | |
| 6,640,308 B1 | 10/2003 | Keyghobad et al. | |
| 6,650,195 B1 | 11/2003 | Brunn et al. | |
| 6,675,328 B1 | 1/2004 | Krishnamachari et al. | |

(Continued)

FOREIGN PATENT DOCUMENTS

| | | |
|---|---|---|
| CN | 102067689 | 5/2011 |
| EP | 1860827 | 11/2007 |

(Continued)

OTHER PUBLICATIONS

"Final Office Action", U.S. Appl. No. 12/323,292, Aug. 24, 2012, 26 pages.

(Continued)

*Primary Examiner* — Fanghwa Wang

(57) ABSTRACT

This disclosure describes techniques and/or apparatuses for coexisting radio communication. In some aspects, a first radio module transmits a protection frame to a remote entity through an antenna effective to prevent the remote entity from transmitting a signal to the first radio module while a second radio module has access to the antenna.

20 Claims, 6 Drawing Sheets

(56) References Cited

U.S. PATENT DOCUMENTS

| | | | |
|---|---|---|---|
| 6,738,358 B2 | 5/2004 | Bist et al. | |
| 6,741,846 B1 | 5/2004 | Welland et al. | |
| 6,741,862 B2 | 5/2004 | Chung et al. | |
| 6,754,189 B1 * | 6/2004 | Cloutier et al. | 370/329 |
| 6,816,452 B1 | 11/2004 | Maehata | |
| 6,816,718 B2 | 11/2004 | Yan et al. | |
| 6,922,433 B2 | 7/2005 | Tamura | |
| 6,934,566 B2 | 8/2005 | Kang et al. | |
| 6,946,950 B1 | 9/2005 | Ueno et al. | |
| 6,954,708 B2 | 10/2005 | Rakshani et al. | |
| 7,079,811 B2 | 7/2006 | Lee et al. | |
| 7,092,428 B2 | 8/2006 | Chen et al. | |
| 7,139,540 B2 | 11/2006 | Wu et al. | |
| 7,173,431 B1 | 2/2007 | Lo et al. | |
| 7,174,488 B1 | 2/2007 | Chu | |
| 7,206,840 B2 | 4/2007 | Choi et al. | |
| 7,212,798 B1 | 5/2007 | Adams et al. | |
| 7,239,882 B1 | 7/2007 | Cook | |
| 7,257,095 B2 | 8/2007 | Liu | |
| 7,286,009 B2 | 10/2007 | Andersen et al. | |
| 7,298,183 B2 | 11/2007 | Mirzaei et al. | |
| 7,310,023 B2 | 12/2007 | Cha et al. | |
| 7,319,849 B2 | 1/2008 | Womac | |
| 7,342,895 B2 | 3/2008 | Serpa et al. | |
| 7,355,416 B1 | 4/2008 | Darshan | |
| 7,377,441 B2 | 5/2008 | Wiklof et al. | |
| 7,395,040 B2 | 7/2008 | Behzad | |
| 7,403,018 B1 | 7/2008 | Lo et al. | |
| 7,463,592 B2 | 12/2008 | Poncini et al. | |
| 7,529,548 B2 | 5/2009 | Sebastian | |
| 7,564,826 B2 | 7/2009 | Sherman et al. | |
| 7,595,768 B2 | 9/2009 | Li et al. | |
| 7,599,671 B2 | 10/2009 | Kopikare et al. | |
| 7,616,935 B2 | 11/2009 | Fernandez-Corbaton et al. | |
| 7,626,966 B1 | 12/2009 | Ruiter et al. | |
| 7,627,025 B2 | 12/2009 | Wang et al. | |
| 7,627,026 B2 | 12/2009 | Wang et al. | |
| 7,636,388 B2 | 12/2009 | Wang et al. | |
| 7,656,205 B2 | 2/2010 | Chen et al. | |
| 7,659,003 B2 | 2/2010 | Aoki et al. | |
| 7,664,085 B2 | 2/2010 | Waxman | |
| 7,672,645 B2 | 3/2010 | Kilpatrick et al. | |
| 7,689,190 B2 | 3/2010 | Kerth et al. | |
| 7,711,004 B2 | 5/2010 | Xu | |
| 7,717,342 B2 | 5/2010 | Wang | |
| 7,725,118 B2 | 5/2010 | Yang et al. | |
| 7,734,253 B2 | 6/2010 | Chen et al. | |
| 7,777,624 B2 | 8/2010 | Wu et al. | |
| 7,826,411 B2 | 11/2010 | Gonikberg et al. | |
| 7,844,222 B2 | 11/2010 | Grushkevich | |
| 7,849,333 B2 | 12/2010 | Schindler | |
| 7,876,786 B2 | 1/2011 | Bahl et al. | |
| 7,881,746 B2 | 2/2011 | Desai | |
| 7,898,948 B2 | 3/2011 | DiGirolamo et al. | |
| 7,936,714 B1 | 5/2011 | Karr et al. | |
| 7,957,340 B2 | 6/2011 | Choi et al. | |
| 7,966,036 B2 | 6/2011 | Kojima | |
| 7,983,216 B2 | 7/2011 | Iyer et al. | |
| 7,995,544 B2 | 8/2011 | Benveniste | |
| 8,000,715 B2 | 8/2011 | Melpignano et al. | |
| 8,014,329 B2 | 9/2011 | Gong | |
| 8,045,922 B2 | 10/2011 | Sherman et al. | |
| 8,046,024 B2 | 10/2011 | Sudak et al. | |
| 8,060,017 B2 | 11/2011 | Schlicht et al. | |
| 8,072,913 B2 | 12/2011 | Desai | |
| 8,073,388 B2 | 12/2011 | Grushkevich et al. | |
| 8,077,652 B2 | 12/2011 | Thesling | |
| 8,078,111 B2 | 12/2011 | Jovicic et al. | |
| 8,081,038 B2 | 12/2011 | Lee et al. | |
| 8,085,737 B2 | 12/2011 | Zhu | |
| 8,107,391 B2 | 1/2012 | Wu et al. | |
| 8,121,144 B2 | 2/2012 | Bitran | |
| 8,126,502 B2 | 2/2012 | Trainin | |
| 8,139,670 B1 | 3/2012 | Son et al. | |
| 8,140,075 B2 | 3/2012 | Watanabe | |
| 8,149,715 B1 | 4/2012 | Goel | |
| 8,150,328 B2 | 4/2012 | Chaudhri et al. | |
| 8,159,928 B2 | 4/2012 | Gorokhov et al. | |
| 8,165,102 B1 | 4/2012 | Vleugels et al. | |
| 8,170,002 B2 | 5/2012 | Wentink | |
| 8,170,546 B2 | 5/2012 | Bennett | |
| 8,189,506 B2 | 5/2012 | Kneckt et al. | |
| 8,189,526 B2 | 5/2012 | Hsu et al. | |
| 8,204,015 B2 | 6/2012 | Chaudhri et al. | |
| 8,219,142 B2 | 7/2012 | Khairmode et al. | |
| 8,229,087 B2 | 7/2012 | Sumioka et al. | |
| 8,233,928 B2 | 7/2012 | Stanforth et al. | |
| 8,254,296 B1 | 8/2012 | Lambert | |
| 8,256,681 B2 | 9/2012 | Wang | |
| 8,274,885 B2 | 9/2012 | Wu et al. | |
| 8,274,894 B2 | 9/2012 | Kneckt et al. | |
| 8,275,314 B1 | 9/2012 | Lin | |
| 8,310,967 B1 | 11/2012 | Goel | |
| 8,315,564 B2 | 11/2012 | Banerjea | |
| 8,340,034 B1 | 12/2012 | Lee | |
| 8,364,188 B2 | 1/2013 | Srinivasan et al. | |
| 8,369,782 B1 | 2/2013 | Lin et al. | |
| 8,442,434 B2 | 5/2013 | Grushkevich et al. | |
| 8,451,776 B2 | 5/2013 | Dayal et al. | |
| 8,472,427 B1 | 6/2013 | Wheeler et al. | |
| 8,472,968 B1 | 6/2013 | Kim | |
| 8,483,190 B2 | 7/2013 | Donovan | |
| 8,493,966 B2 | 7/2013 | Bendelac | |
| 8,493,992 B2 | 7/2013 | Sella et al. | |
| 8,496,181 B2 | 7/2013 | Wang | |
| 8,526,348 B2 | 9/2013 | Desai | |
| 8,532,041 B1 | 9/2013 | Lambert et al. | |
| 8,537,798 B2 | 9/2013 | Tsfati et al. | |
| 8,537,799 B2 | 9/2013 | Tsfati et al. | |
| 8,553,561 B1 | 10/2013 | Chokshi et al. | |
| 8,571,479 B2 | 10/2013 | Banerjea | |
| 8,577,305 B1 | 11/2013 | Rossi et al. | |
| 8,588,705 B1 | 11/2013 | Tsui et al. | |
| 8,599,814 B1 | 12/2013 | Vleugels et al. | |
| 8,600,324 B1 | 12/2013 | Cousinard et al. | |
| 8,619,732 B2 | 12/2013 | Khairmode et al. | |
| 8,626,067 B2 | 1/2014 | Ko et al. | |
| 8,649,734 B1 | 2/2014 | Lin et al. | |
| 8,654,773 B2 | 2/2014 | Wentink et al. | |
| 8,655,278 B2 | 2/2014 | Laroche et al. | |
| 8,655,279 B2 | 2/2014 | Banerjea | |
| 8,665,848 B2 | 3/2014 | Wentink | |
| 8,699,430 B2 | 4/2014 | Chandramouli et al. | |
| 8,730,927 B2 | 5/2014 | Thoukydides | |
| 8,750,926 B2 | 6/2014 | Fu et al. | |
| 8,767,616 B2 | 7/2014 | Choi et al. | |
| 8,805,303 B2 | 8/2014 | Koo et al. | |
| 8,811,318 B2 | 8/2014 | Jo et al. | |
| 8,842,618 B2 | 9/2014 | Yu et al. | |
| 8,867,481 B2 | 10/2014 | Banerjea et al. | |
| 8,897,706 B1 | 11/2014 | Lin et al. | |
| 8,913,599 B2 | 12/2014 | Gonikberg et al. | |
| 8,923,788 B1 | 12/2014 | Cousinard et al. | |
| 8,982,826 B1 | 3/2015 | Lambert et al. | |
| 8,983,557 B1 | 3/2015 | Sun et al. | |
| 8,989,669 B2 | 3/2015 | Banerjea | |
| 2002/0025810 A1 | 2/2002 | Takayama et al. | |
| 2002/0049854 A1 | 4/2002 | Cox et al. | |
| 2002/0102941 A1 | 8/2002 | Kuiri et al. | |
| 2003/0040316 A1 | 2/2003 | Stanforth et al. | |
| 2003/0148750 A1 | 8/2003 | Yan et al. | |
| 2003/0198200 A1 | 10/2003 | Diener et al. | |
| 2004/0044489 A1 | 3/2004 | Jones et al. | |
| 2004/0063403 A1 | 4/2004 | Durrant | |
| 2004/0105401 A1 | 6/2004 | Lee | |
| 2004/0110470 A1 | 6/2004 | Tsiden et al. | |
| 2004/0162106 A1 * | 8/2004 | Monroe et al. | 455/552.1 |
| 2004/0192222 A1 | 9/2004 | Vaisanen et al. | |
| 2004/0198297 A1 | 10/2004 | Oh et al. | |
| 2004/0214575 A1 | 10/2004 | Jovanovic | |
| 2004/0233881 A1 | 11/2004 | Kang et al. | |
| 2004/0259589 A1 | 12/2004 | Bahl et al. | |
| 2005/0018641 A1 | 1/2005 | Zhao et al. | |
| 2005/0025104 A1 | 2/2005 | Fischer et al. | |

(56) References Cited

U.S. PATENT DOCUMENTS

| | | |
|---|---|---|
| 2005/0025174 A1 | 2/2005 | Fischer et al. |
| 2005/0038876 A1 | 2/2005 | Chaudhuri |
| 2005/0058151 A1 | 3/2005 | Yeh |
| 2005/0064840 A1 | 3/2005 | Heydari et al. |
| 2005/0090218 A1 | 4/2005 | Ishida et al. |
| 2005/0120119 A1 | 6/2005 | Bhanu et al. |
| 2005/0135360 A1 | 6/2005 | Shin et al. |
| 2005/0174962 A1 | 8/2005 | Gurevich |
| 2005/0186962 A1 | 8/2005 | Yoneyama et al. |
| 2005/0206554 A1 | 9/2005 | Yamaura |
| 2005/0215197 A1 | 9/2005 | Chen et al. |
| 2005/0250528 A1 | 11/2005 | Song et al. |
| 2005/0254423 A1 | 11/2005 | Berghoff |
| 2005/0281278 A1 | 12/2005 | Black et al. |
| 2006/0007863 A1 | 1/2006 | Naghian |
| 2006/0049880 A1 | 3/2006 | Rein et al. |
| 2006/0063509 A1 | 3/2006 | Pincu et al. |
| 2006/0079232 A1 | 4/2006 | Omori et al. |
| 2006/0114044 A1 | 6/2006 | Mintchev et al. |
| 2006/0120338 A1 | 6/2006 | Hwang et al. |
| 2006/0128308 A1 | 6/2006 | Michael et al. |
| 2006/0128347 A1 | 6/2006 | Piriyapoksombut et al. |
| 2006/0189359 A1 | 8/2006 | Kammer et al. |
| 2006/0199565 A1 | 9/2006 | Ammirata |
| 2006/0200862 A1 | 9/2006 | Olson et al. |
| 2006/0215601 A1 | 9/2006 | Vleugels et al. |
| 2006/0223474 A1 | 10/2006 | Yoshizaki et al. |
| 2006/0239443 A1 | 10/2006 | Oxford et al. |
| 2006/0251198 A1 | 11/2006 | Ma et al. |
| 2006/0252418 A1 | 11/2006 | Quinn et al. |
| 2006/0264179 A1 | 11/2006 | Bonneville et al. |
| 2006/0268756 A1 | 11/2006 | Wang et al. |
| 2006/0268804 A1 | 11/2006 | Kim et al. |
| 2006/0281404 A1 | 12/2006 | Lee et al. |
| 2006/0282541 A1 | 12/2006 | Hiroki |
| 2006/0282667 A1 | 12/2006 | Kim et al. |
| 2006/0286935 A1 | 12/2006 | Utsunomiya et al. |
| 2007/0010237 A1 | 1/2007 | Jones et al. |
| 2007/0010247 A1 | 1/2007 | Mouna-Kingue et al. |
| 2007/0014314 A1 | 1/2007 | O'Neil |
| 2007/0026810 A1 | 2/2007 | Love et al. |
| 2007/0077908 A1 | 4/2007 | Vorenkamp et al. |
| 2007/0081553 A1 | 4/2007 | Cicchetti et al. |
| 2007/0103829 A1 | 5/2007 | Darshan et al. |
| 2007/0109973 A1 | 5/2007 | Trachewsky |
| 2007/0142080 A1 | 6/2007 | Tanaka et al. |
| 2007/0173286 A1 | 7/2007 | Carter et al. |
| 2007/0178888 A1 | 8/2007 | Alfano et al. |
| 2007/0183443 A1 | 8/2007 | Won |
| 2007/0200622 A1 | 8/2007 | Filoramo et al. |
| 2007/0202814 A1 | 8/2007 | Ono et al. |
| 2007/0206519 A1 | 9/2007 | Hansen et al. |
| 2007/0206762 A1 | 9/2007 | Chandra et al. |
| 2007/0223430 A1 | 9/2007 | Desai et al. |
| 2007/0238482 A1 | 10/2007 | Rayzman et al. |
| 2007/0242645 A1 | 10/2007 | Stephenson et al. |
| 2007/0264959 A1 | 11/2007 | Carrez |
| 2007/0268862 A1 | 11/2007 | Singh et al. |
| 2007/0280471 A1 | 12/2007 | Fallahi et al. |
| 2007/0286298 A1 | 12/2007 | Choi et al. |
| 2007/0297388 A1 | 12/2007 | Appaji et al. |
| 2008/0022162 A1 | 1/2008 | Qiu |
| 2008/0027033 A1 | 1/2008 | Gonda et al. |
| 2008/0045162 A1 | 2/2008 | Rofougaran et al. |
| 2008/0056201 A1 | 3/2008 | Bennett |
| 2008/0069034 A1 | 3/2008 | Buddhikot et al. |
| 2008/0076466 A1 | 3/2008 | Larsson |
| 2008/0080446 A1 | 4/2008 | Chung |
| 2008/0095058 A1 | 4/2008 | Dalmases et al. |
| 2008/0095059 A1 | 4/2008 | Chu |
| 2008/0111639 A1 | 5/2008 | Ryckaert et al. |
| 2008/0129118 A1 | 6/2008 | Diab |
| 2008/0130595 A1 | 6/2008 | Abdel-Kader |
| 2008/0137580 A1 | 6/2008 | Axelsson et al. |
| 2008/0139212 A1* | 6/2008 | Chen et al. ............ 455/450 |
| 2008/0161031 A1 | 7/2008 | Tu |
| 2008/0170550 A1 | 7/2008 | Liu et al. |
| 2008/0181154 A1 | 7/2008 | Sherman |
| 2008/0187003 A1 | 8/2008 | Becker |
| 2008/0232287 A1 | 9/2008 | Shao et al. |
| 2008/0238679 A1 | 10/2008 | Rofougaran et al. |
| 2008/0259846 A1 | 10/2008 | Gonikberg et al. |
| 2008/0261552 A1 | 10/2008 | Chung |
| 2008/0261640 A1 | 10/2008 | Yoshida |
| 2008/0262991 A1 | 10/2008 | Kapoor et al. |
| 2008/0272818 A1 | 11/2008 | Ko |
| 2008/0279138 A1 | 11/2008 | Gonikberg et al. |
| 2008/0279162 A1 | 11/2008 | Desai |
| 2008/0279163 A1 | 11/2008 | Desai |
| 2008/0280638 A1 | 11/2008 | Malladi et al. |
| 2008/0310067 A1 | 12/2008 | Diab et al. |
| 2008/0320108 A1 | 12/2008 | Murty et al. |
| 2009/0005061 A1 | 1/2009 | Ward et al. |
| 2009/0010210 A1 | 1/2009 | Hiertz et al. |
| 2009/0030976 A1 | 1/2009 | Shukla et al. |
| 2009/0067396 A1 | 3/2009 | Fischer |
| 2009/0137206 A1 | 5/2009 | Sherman et al. |
| 2009/0143043 A1 | 6/2009 | Yoshizaki et al. |
| 2009/0147763 A1 | 6/2009 | Desai et al. |
| 2009/0168686 A1 | 7/2009 | Love et al. |
| 2009/0168725 A1 | 7/2009 | Mishra |
| 2009/0170497 A1 | 7/2009 | Miao et al. |
| 2009/0175250 A1 | 7/2009 | Mathur et al. |
| 2009/0190541 A1 | 7/2009 | Abedi |
| 2009/0196210 A1 | 8/2009 | Desai |
| 2009/0202013 A1 | 8/2009 | Sebastian |
| 2009/0209288 A1* | 8/2009 | Rofougaran ............ 455/556.1 |
| 2009/0235316 A1 | 9/2009 | Wu et al. |
| 2009/0239471 A1 | 9/2009 | Tran et al. |
| 2009/0240998 A1 | 9/2009 | Sherman et al. |
| 2009/0245133 A1 | 10/2009 | Gupta et al. |
| 2009/0245279 A1 | 10/2009 | Wan et al. |
| 2009/0247217 A1 | 10/2009 | Hsu et al. |
| 2009/0268652 A1 | 10/2009 | Kneckt et al. |
| 2009/0275299 A1 | 11/2009 | Buch et al. |
| 2009/0280762 A1 | 11/2009 | Park et al. |
| 2009/0285264 A1 | 11/2009 | Aldana et al. |
| 2009/0291640 A1 | 11/2009 | Bhattad et al. |
| 2009/0291690 A1 | 11/2009 | Guvenc et al. |
| 2009/0311961 A1 | 12/2009 | Banerjea |
| 2009/0312027 A1 | 12/2009 | Foschini et al. |
| 2009/0321056 A1 | 12/2009 | Ran et al. |
| 2009/0325591 A1 | 12/2009 | Liu et al. |
| 2010/0009675 A1 | 1/2010 | Wijting et al. |
| 2010/0011231 A1 | 1/2010 | Banerjea et al. |
| 2010/0029325 A1 | 2/2010 | Wang et al. |
| 2010/0052796 A1 | 3/2010 | Menkhoff |
| 2010/0061244 A1 | 3/2010 | Meier et al. |
| 2010/0062799 A1 | 3/2010 | Ishii et al. |
| 2010/0069112 A1 | 3/2010 | Sun et al. |
| 2010/0080319 A1 | 4/2010 | Blocher et al. |
| 2010/0082957 A1 | 4/2010 | Iwata |
| 2010/0097952 A1 | 4/2010 | McHenry et al. |
| 2010/0103867 A1 | 4/2010 | Kishiyama et al. |
| 2010/0130129 A1 | 5/2010 | Chang et al. |
| 2010/0135256 A1 | 6/2010 | Lee et al. |
| 2010/0138549 A1 | 6/2010 | Goel et al. |
| 2010/0165896 A1 | 7/2010 | Gong et al. |
| 2010/0189165 A1 | 7/2010 | Xu et al. |
| 2010/0216497 A1 | 8/2010 | Kawasaki |
| 2010/0238793 A1 | 9/2010 | Alfano et al. |
| 2010/0248734 A1 | 9/2010 | Yamazaki et al. |
| 2010/0283654 A1 | 11/2010 | Waheed et al. |
| 2010/0284355 A1 | 11/2010 | Jung et al. |
| 2010/0293293 A1 | 11/2010 | Beser |
| 2010/0303026 A1 | 12/2010 | Chaudhri et al. |
| 2010/0316027 A1 | 12/2010 | Rick et al. |
| 2010/0322213 A1 | 12/2010 | Liu et al. |
| 2011/0002226 A1 | 1/2011 | Bhatti |
| 2011/0007675 A1 | 1/2011 | Chiou et al. |
| 2011/0009074 A1 | 1/2011 | Hsu et al. |
| 2011/0021240 A1 | 1/2011 | Hiltunen et al. |
| 2011/0026488 A1 | 2/2011 | Patel et al. |
| 2011/0053522 A1 | 3/2011 | Rofougaran et al. |

(56) References Cited

U.S. PATENT DOCUMENTS

| | | | |
|---|---|---|---|
| 2011/0097998 A1 | 4/2011 | Ko et al. |
| 2011/0103363 A1 | 5/2011 | Bennett |
| 2011/0116488 A1 | 5/2011 | Grandhi |
| 2011/0161697 A1 | 6/2011 | Qi et al. |
| 2011/0164538 A1 | 7/2011 | Karr et al. |
| 2011/0188391 A1 | 8/2011 | Sella et al. |
| 2011/0194519 A1 | 8/2011 | Habetha |
| 2011/0205924 A1 | 8/2011 | Gonikberg et al. |
| 2011/0274040 A1 | 11/2011 | Pani et al. |
| 2012/0020319 A1 | 1/2012 | Song et al. |
| 2012/0025921 A1 | 2/2012 | Yang et al. |
| 2012/0039176 A1 | 2/2012 | Eshan et al. |
| 2012/0087341 A1 | 4/2012 | Jang et al. |
| 2012/0099476 A1 | 4/2012 | Mahaffy |
| 2012/0115420 A1 | 5/2012 | Trainin |
| 2012/0195397 A1 | 8/2012 | Sayana et al. |
| 2012/0212628 A1 | 8/2012 | Wu et al. |
| 2012/0213162 A1 | 8/2012 | Koo et al. |
| 2012/0213208 A1 | 8/2012 | Hsu et al. |
| 2012/0244805 A1 | 9/2012 | Haikonen et al. |
| 2012/0276938 A1 | 11/2012 | Wagholikar et al. |
| 2012/0294396 A1 | 11/2012 | Desai |
| 2012/0327779 A1 | 12/2012 | Gell et al. |
| 2013/0045687 A1 | 2/2013 | Banerjea |
| 2013/0045688 A1 | 2/2013 | Banerjea |
| 2013/0057344 A1 | 3/2013 | Touzard et al. |
| 2013/0114548 A1 | 5/2013 | Banerjea |
| 2013/0130684 A1 | 5/2013 | Gomes et al. |
| 2013/0176903 A1 | 7/2013 | Bijwe |
| 2013/0217401 A1 | 8/2013 | Edge et al. |
| 2013/0225068 A1 | 8/2013 | Kiminki et al. |
| 2013/0287043 A1 | 10/2013 | Nanda et al. |
| 2013/0301420 A1 | 11/2013 | Zhang et al. |
| 2014/0003318 A1 | 1/2014 | Desai |
| 2014/0004794 A1 | 1/2014 | Contaldo et al. |
| 2014/0043966 A1 | 2/2014 | Lee et al. |
| 2014/0044106 A1 | 2/2014 | Bhagwat |
| 2014/0073251 A1 | 3/2014 | Banerjea |
| 2014/0087663 A1 | 3/2014 | Burchill et al. |
| 2014/0126552 A1 | 5/2014 | Dayal et al. |

FOREIGN PATENT DOCUMENTS

| | | |
|---|---|---|
| EP | 2299642 | 3/2011 |
| EP | 2456275 | 5/2012 |
| JP | 2006174162 | 6/2006 |
| JP | 200728568 | 2/2007 |
| JP | 2007028568 | 2/2007 |
| WO | WO-0178252 | 10/2001 |
| WO | WO-02082751 | 10/2002 |
| WO | WO-02091623 | 11/2002 |
| WO | WO-2006043956 | 4/2006 |
| WO | WO-2006090254 | 8/2006 |
| WO | WO-2007008981 | 1/2007 |
| WO | WO-2007064822 | 6/2007 |
| WO | WO-2008707777 | 6/2008 |
| WO | WO-2008150122 | 12/2008 |
| WO | WO-2009101567 | 8/2009 |
| WO | WO-2011056878 | 5/2011 |
| WO | WO-2013104989 | 7/2013 |
| WO | WO-2013119810 | 8/2013 |

OTHER PUBLICATIONS

"Foreign Office Action", European Patent Application No. 09789754.0, Jul. 12, 2012, 4 pages.

"Non-Final Office Action", U.S. Appl. No. 12/759,336, Oct. 4, 2012, 13 pages.

"Notice of Allowance", U.S. Appl. No. 12/190,251, Oct. 4, 2012, 6 pages.

"Non-Final Office Action", U.S. Appl. No. 12/190,251, (Mar. 29, 2012), 11 pages.

"Notice of Allowance", U.S. Appl. No. 12/190,240, (May 16, 2012), 4 pages.

"Notice of Allowance", U.S. Appl. No. 12/478,446, (Jun. 14, 2012), 6 pages.

"Final Office Action", U.S. Appl. No. 12/190,251, (Sep. 13, 2011), 15 pages.

"Foreign Office Action", EP Application No. 09789754.0, (May 17, 2011), 8 pages.

"Information Technology—Telecommunications and Information Exchange between Systems—Local and Metropolitan Area Networks—Specific Requirements", Part 11: *Wireless LAN Medium Access Control (MAC) and Physical Layer (PHY) Specifications*, IEEE Standard 802.11h-2003 (Amendment to IEEE Std 802.11-1993),(Oct. 14, 2003), 80 pages.

"Non-Final Office Action", U.S. Appl. No. 12/190,251, (Mar. 29, 2011), 8 pages.

"Non-Final Office Action", U.S. Appl. No. 12/534,361, (Oct. 12, 2011), 11 pages.

"Part 11: Wireless LAN Medium Access Control (MAC) and Physical Layer (PHY) specifications", Information technology—Telecommunications and information exchange between systems—Local and metropolitan area networks—Specific requirements—, IEEE,(Apr. 2003), pp. 1-69.

"PCT Search Report", Application No. PCT/US2009/046289, (Oct. 29, 2009), 13 pages.

Jung, Eun-Sun et al., "A Power Control MAC Protocol for Ad Hoc Networks", *Wireless Networks; The Journal of Mobile Communication, Computation, and Information*, vol. 11, No. 1-2, Kluwer Academic Publishers,(Jan. 1, 2005), pp. 55-66.

"Final Office Action", U.S. Appl. No. 12/759,336, Feb. 25, 2013, 11 pages.

"Foreign Office Action", Chinese Application No. 200980122587.0, Feb. 21, 2013, 17 pages.

"Foreign Office Action", Japanese Application No. 2011-513586, Apr. 9, 2013, 4 Pages.

"Non-Final Office Action", U.S. Appl. No. 13/656,482, Mar. 19, 2013, 19 pages.

"Non-Final Office Action", U.S. Appl. No. 13/656,502, Feb. 21, 2013, 6 pages.

"Non-Final Office Action", U.S. Appl. No. 13/604,563, Apr. 5, 2013, 6 pages.

"Notice of Allowance", U.S. Appl. No. 12/534,361, Feb. 14, 2013, 12 pages.

"Foreign Office Action", European Patent Application No. 09789754.0, Mar. 11, 2013, 4 Pages.

"Notice of Allowance", U.S. Appl. No. 12/759,336, May 3, 2013, 9 pages.

"Supplemental Notice of Allowance", U.S. Appl. No. 12/759,336, Jun. 5, 2013, 2 pages.

Jung, et al.,"A Power Control MAC Protocol for Ad Hoc Networks", Wireless Networks ; The Journal of Mobile Communication, Computation and Information, Kluwer Academic Publishers vol. 11, No. 1-2, Jan. 1, 2005, 12 Pages.

"Foreign Notice of Allowance", Japanese Application No. 2011-513586, Jul. 16, 2013, 2 pages.

Qiao, et al.,"Interference Analysis and Transmit Power Control in IEEE 802.11a/h Wireless LANs", IEEE / ACM Transactions on Networking, IEEE / ACM, New York, NY, US, vol. 15. No. 5, Oct. 1, 2007, 14 Pages.

"Notice of Allowance", U.S. Appl. No. 12/323,292, Jun. 28, 2013, 8 pages.

Tinnirello et al.,"Revisit of RTS / CTS Exchange in High-Speed IEEE 802.11 Networks", World of Wireless Mobile and Multimedia Networks. 2005. Wowmom 2005. Sixth IEEE International Symposium on a Taormina-Giardini Naxos, Italy Jun. 13-16, 2005 Piscataway, NJ, USA,IEEE, Los Alamitos, CA, USA, Jun. 13, 2005, 10 Pages.

"Search Report", European Application No. 13169350.9, Aug. 13, 2013, 10 Pages.

"Supplemental Notice of Allowance", U.S. Appl. No. 12/759,336, Jun. 18, 2013, 2 pages.

"Supplemental Notice of Allowance", U.S. Appl. No. 12/759,336, Aug. 14, 2013, 2 pages.

"Foreign Office Action", Japanese Application No. 2011-513586, Oct. 23, 2012, 7 pages.

(56) References Cited

OTHER PUBLICATIONS

"Advisory Action", U.S. Appl. No. 12/190,251, (Dec. 7, 2011), 3 pages.
"Final Office Action", U.S. Appl. No. 12/534,361, (Feb. 29, 2012), 13 pages.
"Non-Final Office Action", U.S. Appl. No. 12/190,240, (Jan. 6, 2012), 7 pages.
"Non-Final Office Action", U.S. Appl. No. 12/323,292, (Dec. 21, 2011), 17 pages.
"Non-Final Office Action", U.S. Appl. No. 12/478,446, (Dec. 28, 2011), 17 pages.
"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331; V10.5.0; 3GPP Organizational Partners, 2012, 302 pages.
"Advisory Action", U.S. Appl. No. 12/646,721, Aug. 13, 2013, 3 pages.
"Draft Standard for Information Technology—Telecommunications and information exchange between systems—Local and metropolitan area networks—Specific requirements", IEEE P802.11s/D1.03, Apr. 2007, 251 pages.
"Final Office Action", U.S. Appl. No. 12/186,429, Oct. 13, 2011, 23 pages.
"Final Office Action", U.S. Appl. No. 12/358,955, Feb. 17, 2012, 26 pages.
"Final Office Action", U.S. Appl. No. 12/358,955, Mar. 18, 2013, 12 pages.
"Final Office Action", U.S. Appl. No. 12/484,563, Apr. 24, 2012, 18 pages.
"Final Office Action", U.S. Appl. No. 12/487,425, May 3, 2012, 9 pages.
"Final Office Action", U.S. Appl. No. 12/542,845, Sep. 25, 2012, 23 pages.
"Final Office Action", U.S. Appl. No. 12/616,454, Apr. 11, 2012, 19 pages.
"Final Office Action", U.S. Appl. No. 12/646,721, Jun. 6, 2013, 16 pages.
"Final Office Action", U.S. Appl. No. 12/646,802, Nov. 15, 2012, 15 pages.
"Foreign Office Action", CN Application No. 200980122587.0, Sep. 10, 2013, 11 Pages.
"Foreign Office Action", Chinese Application No. 200980122587.0, Jan. 24, 2014, 10 Pages.
"Further Higher Data Rate Extension in the 2.4 GHz Band", IEEE P802.11g/D8.2, DRAFT Supplement to Standard [for] Information Technology, Apr. 2003, 69 pages.
"IEEE Standard for Information Technology—Telecommunications and information exchange between systems—Local and metropolitan area networks—Specific requirements Part 11: Wireless LAN Medium Access Control (MAC) and Physical Layer (PHY) specifications Amendment", IEEE Computer Society, Oct. 14, 2010, pp. 12-18, 23, 65-68.
"Information Technology—Telecommunications and Information Exchange Between systems—Local and Metropolitan Area Networks—Specific Requirements", IEEE Standard, Aug. 1, 2005, pp. 1-60.
"International Search Report and Written Opinion", Application No. PCT/US2012/035597, Aug. 6, 2012, 13 pages.
"International Search Report and Written Opinion", Application No. PCT/IB2013/001962, Feb. 6, 2014, 11 Pages.
"Non-Final Office Action", U.S. Appl. No. 13/429,090, Oct. 24, 2013, 13 pages.
"Non-Final Office Action", U.S. Appl. No. 12/167,841, Jul. 15, 2011, 10 pages.
"Non-Final Office Action", U.S. Appl. No. 12/186,429, Apr. 25, 2011, 19 pages.
"Non-Final Office Action", U.S. Appl. No. 12/235,333, Jun. 28, 2011, 16 pages.
"Non-Final Office Action", U.S. Appl. No. 12/358,955, Sep. 6, 2011, 24 pages.
"Non-Final Office Action", U.S. Appl. No. 12/358,955, Aug. 20, 2012, 33 pages.
"Non-Final Office Action", U.S. Appl. No. 12/484,563, Oct. 4, 2011, 13 pages.
"Non-Final Office Action", U.S. Appl. No. 12/487,425, Jan. 12, 2012, 7 pages.
"Non-Final Office Action", U.S. Appl. No. 12/542,845, Oct. 23, 2013, 29 pages.
"Non-Final Office Action", U.S. Appl. No. 12/542,845, Apr. 4, 2012, 19 pages.
"Non-Final Office Action", U.S. Appl. No. 12/616,454, Dec. 22, 2011, 8 pages.
"Non-Final Office Action", U.S. Appl. No. 12/646,721, Nov. 7, 2012, 15 pages.
"Non-Final Office Action", U.S. Appl. No. 12/646,721, May 10, 2012, 15 pages.
"Non-Final Office Action", U.S. Appl. No. 12/646,802, Mar. 29, 2012, 16 pages.
"Non-Final Office Action", U.S. Appl. No. 12/732,036, Aug. 9, 2012, 13 pages.
"Non-Final Office Action", U.S. Appl. No. 13/099,169, Mar. 28, 2013, 12 pages.
"Non-Final Office Action", U.S. Appl. No. 13/099,169, Oct. 4, 2013, 9 pages.
"Non-Final Office Action", U.S. Appl. No. 13/249,740, Mar. 26, 2013, 9 pages.
"Non-Final Office Action", U.S. Appl. No. 13/249,740, Oct. 16, 2013, 9 pages.
"Non-Final Office Action", U.S. Appl. No. 13/479,124, Sep. 27, 2013, 14 pages.
"Non-Final Office Action", U.S. Appl. No. 13/757,276, Jan. 30, 2014, 9 pages.
"Non-Final Office Action", U.S. Appl. No. 13/911,979, Jan. 31, 2014, 19 pages.
"Notice of Allowance", U.S. Appl. No. 12/167,841, Nov. 25, 2011, 11 pages.
"Notice of Allowance", U.S. Appl. No. 12/186,429, Jun. 6, 2013, 9 pages.
"Notice of Allowance", U.S. Appl. No. 12/235,333, Nov. 15, 2011, 5 pages.
"Notice of Allowance", U.S. Appl. No. 12/358,955, Jul. 1, 2013, 8 pages.
"Notice of Allowance", U.S. Appl. No. 12/484,563, Jul. 9, 2012, 6 pages.
"Notice of Allowance", U.S. Appl. No. 12/487,425, Jul. 26, 2013, 9 pages.
"Notice of Allowance", U.S. Appl. No. 12/616,454, Aug. 22, 2012, 4 pages.
"Notice of Allowance", U.S. Appl. No. 12/716,569, Apr. 19, 2012, 7 pages.
"Notice of Allowance", U.S. Appl. No. 12/732,036, Feb. 21, 2013, 8 pages.
"Notice of Allowance", U.S. Appl. No. 13/604,563, Sep. 26, 2013, 5 pages.
"Notice of Allowance", U.S. Appl. No. 13/656,482, Sep. 3, 2013, 8 pages.
"Part 11: Wireless LAN Medium Access Control (MAC) and Physical Layer (PHY) specifications", IEEE Std 802.11b-1999/Cor Jan. 2001, Amendment 2: Higher-speed Physical Layer (PHY) extension in the 2.4 GHz band,Nov. 7, 2001, 23 pages.
"Part 11: Wireless LAN Medium Access Control (MAC) and Physical Layer (PHY) specifications", IEEE Std 802.11a-1999, High-speed Physical Layer in the 5 GHz Band,1999, 91 pages.
"PCT Search Report and Written Opinion", Application No. PCT/IB2013/000390, Aug. 21, 2013, 19 Pages.
"PCT Search Report and Written Opinion", Application No. PCT/US2013/025144, Jun. 5, 2013, 10 pages.
"PCT Search Report and Written Opinion", Application No. PCT/US2011/054358, Dec. 16, 2011, 13 pages.
"Restriction Requirement", U.S. Appl. No. 12/167,841, May 12, 2011, 6 pages.

(56) References Cited

OTHER PUBLICATIONS

"Supplemental Notice of Allowance", U.S. Appl. No. 12/186,429, Jul. 10, 2013, 2 pages.
"Supplemental Notice of Allowance", U.S. Appl. No. 12/323,292, Oct. 17, 2013, 2 pages.
"Supplemental Notice of Allowance", U.S. Appl. No. 12/323,292, Oct. 7, 2013, 2 pages.
"Supplemental Notice of Allowance", U.S. Appl. No. 12/358,955, Oct. 11, 2013, 3 pages.
"Supplemental Notice of Allowance", U.S. Appl. No. 12/716,569, Jul. 23, 2012, 2 pages.
"Supplemental Notice of Allowance", U.S. Appl. No. 13/656,482, Nov. 29, 2013, 2 pages.
"Supplemental Notice of Allowance", U.S. Appl. No. 13/656,482, Dec. 19, 2013, 2 pages.
Haas, et al.,3 "Gossip-Based Ad Hoc Routing", IEEE/ACM Transactions on Networking, vol. 14, No. 3, Jun. 2006, pp. 479-491.
Mazzanti, et al.,' "Analysis and Design of Injection-Locked LC Dividers for Quadrature Generation", IEEE Journal of Solid-State Circuits, vol. 39, No. 9, Sep. 2004, pp. 1425-1433.
Mujtaba, "TGn Sync Proposal Technical Specification", IEEE 802.11-04/0889r6, This document presents the technical specification for the MAC and the PHY layer of the TGn Sync proposal to IEEE 802.11 TGn, May 18, 2005, pp. 1-131.
"Foreign Office Action", EP Application No. 13169350.9, May 9, 2014, 3 Pages.
"Non-Final Office Action", U.S. Appl. No. 13/536,506, Apr. 25, 2014, 12 pages.
"Non-Final Office Action", U.S. Appl. No. 13/911,979, Jun. 9, 2014, 11 pages.
"Non-Final Office Action", U.S. Appl. No. 14/089,515, May 13, 2014, 9 pages.
"Foreign Office Action", CN Application No. 200980122587.0, Jul. 3, 2014, 12 Pages.
"Non-Final Office Action", U.S. Appl. No. 13/458,227, Jul. 3, 2014, 10 pages.
"Non-Final Office Action", U.S. Appl. No. 14/018,232, Aug. 13, 2014, 6 pages.
"Non-Final Office Action", U.S. Appl. No. 14/082,981, Aug. 4, 2014, 6 pages.
"Notice of Allowance", U.S. Appl. No. 13/757,276, Jul. 8, 2014, 6 pages.
"Notice of Allowance", U.S. Appl. No. 14/089,515, Aug. 21, 2014, 4 pages.
"Non-Final Office Action", U.S. Appl. No. 13/622,916, Sep. 10, 2014, 10 pages.
"Non-Final Office Action", U.S. Appl. No. 14/063,972, Sep. 24, 2014, 6 pages.
"Notice of Allowance", U.S. Appl. No. 13/536,506, Sep. 19, 2014, 7 pages.
"Notice of Allowance", U.S. Appl. No. 13/911,979, Nov. 20, 2014, 12 pages.
"Notice of Allowance", U.S. Appl. No. 14/018,232, Nov. 5, 2014, 7 pages.
"Notice of Allowance", U.S. Appl. No. 14/063,972, Nov. 7, 2014, 8 pages.
"Supplemental Notice of Allowance", U.S. Appl. No. 13/757,276, Oct. 24, 2014, 2 pages.
"Corrected Notice of Allowance", U.S. Appl. No. 14/063,972, Jan. 26, 2015, 2 pages.
"Corrected Notice of Allowance", U.S. Appl. No. 14/063,972, Feb. 25, 2015, 2 pages.
"Foreign Office Action", CN application No. 200980122587.0, Dec. 3, 2014, 10 pages.
"Non-Final Office Action", U.S. Appl. No. 13/761,949, Jan. 12, 2015, 16 pages.
"Non-Final Office Action", U.S. Appl. No. 14/082,981, Feb. 13, 2015, 13 pages.
"Notice of Allowance", U.S. Appl. No. 13/458,227, Jan. 2, 2015, 7 pages.
"Notice of Allowance", U.S. Appl. No. 13/622,916, Mar. 30, 2015, 4 pages.
"Restriction Requirement", U.S. Appl. No. 14/071,171, Apr. 27, 2015, 6 pages.
"Supplemental Notice of Allowance", U.S. Appl. No. 13/622,916, May 7, 2015, 2 pages.

* cited by examiner

COEXISTING RADIO COMMUNICATION

RELATED APPLICATIONS

This application claims priority to U.S. Provisional Patent Application Ser. No. 61/243,069 filed Sep. 16, 2009, the disclosure of which is incorporated by reference herein in its entirety. This application also claims priority to U.S. Provisional Patent Application Ser. No. 61/243,080 filed Sep. 16, 2009, the disclosure of which is incorporated by reference herein in its entirety

BACKGROUND

The background description provided herein is for the purpose of generally presenting the context of the disclosure. Unless otherwise indicated herein, the approaches described in this section are not prior art to the claims in this application and are not admitted to be prior art by inclusion in this section.

Wireless communication devices typically employ multiple radio modules to communicate over multiple wireless networks according to various protocols. These devices often have fewer antennas than radio modules resulting in radio modules timesharing an antenna in order to communicate. A packet or frame communication of a radio module, however, is typically time sensitive and not synchronized with communications of the other radio modules. To communicate a time-sensitive packet or frame, a radio module may access the antenna while another radio module has access for communication. Accordingly, when two or more radio modules attempt to simultaneously communicate via the antenna, communications of one or both radio modules are disrupted resulting in cancelled transmissions, dropped packets, and/or degraded performance as data rates are reduced to compensate for communication errors.

SUMMARY

This summary is provided to introduce subject matter that is further described below in the Detailed Description and Drawings. Accordingly, this Summary should not be considered to describe essential features nor used to limit the scope of the claimed subject matter.

A system-on-chip is described that is configured to change a first radio module from a listening mode to a lower power mode to prevent the first radio module from using an exclusive-access period for antenna access effective to increase a nonexclusive-access period, and to grant a second radio module access to the antenna for at least a portion of the increased nonexclusive-access period.

A method is described for receiving an indication of an impending transfer of exclusive access to an antenna currently held by a first radio module to a second radio module, the exclusive access to be held by the second radio module for an amount of time, and responsive to receiving the indication and before the transfer of exclusive access, transmitting a protection frame to a remote entity to cause the remote entity to refrain from transmitting a signal to the first radio module for a portion of the amount of time exclusive access is held by the second radio module.

Another method is described for determining that a communication period of a first radio module will overlap with a periodic transmission time of a second radio module, and responsive to determining that the communication period of the first radio module will overlap with the periodic transmission time of the second radio module, delaying the periodic transmission time of the second radio module until completing the communication period of the first radio module.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Conventional techniques for implementing multiple radio modules in a single device may allow a radio module to access an antenna while another radio module is communicating via the antenna. This can disrupt communications of either one or both radio modules. These disruptions of communication result in cancelled transmissions, dropped packets, and/or degraded performance as data rates are reduced to compensate for communication errors. This disclosure describes techniques for coexisting radio communication that reduce or eliminate these disruptions.

The following discussion describes an operating environment, techniques, and apparatuses that may be employed in the operating environment, and a System-on-Chip (SoC) in which components of the operating environment can be embodied. In the discussion below, reference is made to the operating environment by way of example only.

Operating Environment

Figure 1:
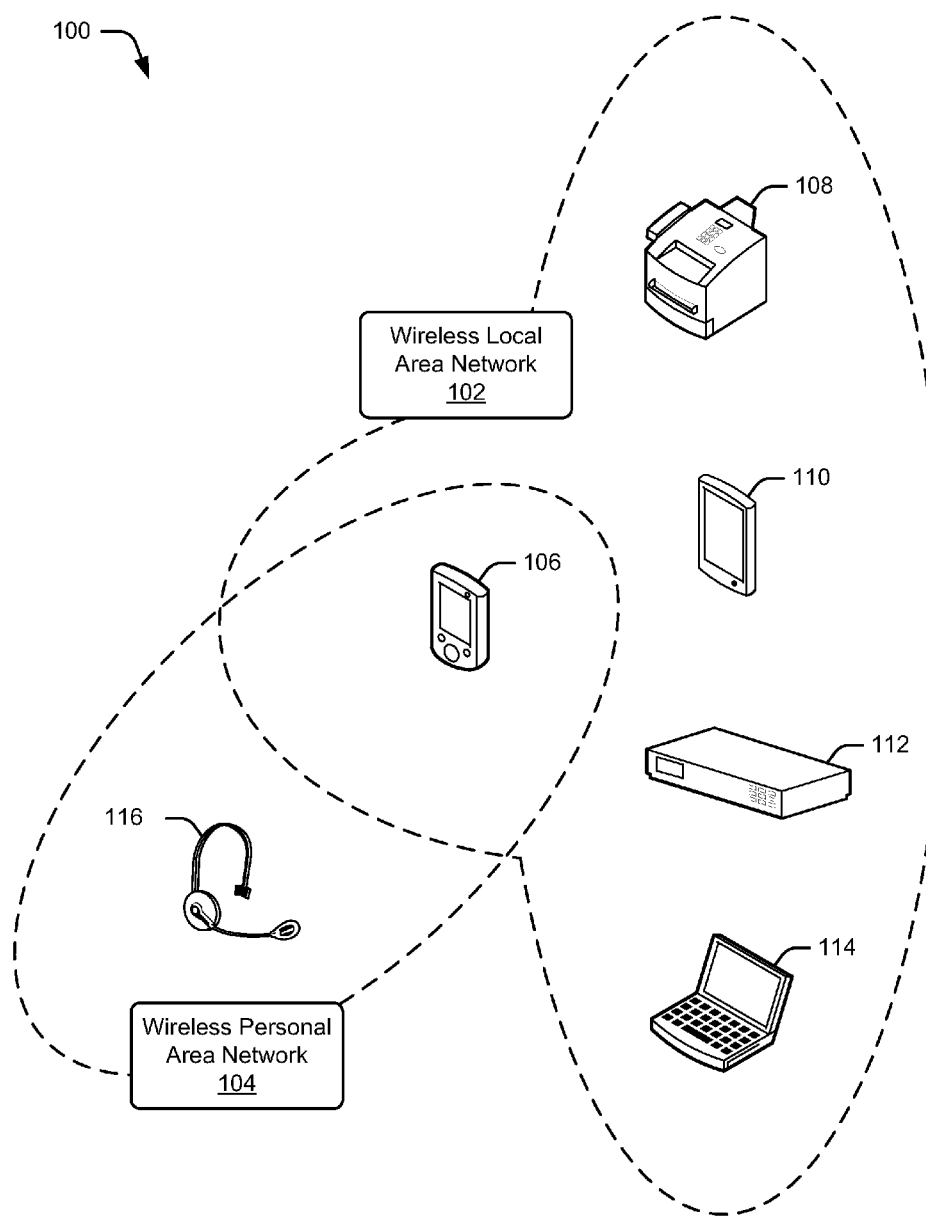
FIG. 1 illustrates an operating environment having wireless communication devices capable of communication in accordance with one or more aspects.

FIG. 1 illustrates an operating environment 100 having a wireless local area network 102 and a wireless personal area network 104, each of which include wireless communication devices. Wireless local area network 102 includes a smart-phone 106, a wireless printer 108, a tablet computer 110, a set-top box 112, and a laptop computer 114. Personal area network 104 includes smart-phone 106 and a wireless headset 116. Each of these wireless communication device may transmit and/or receive communications from other devices within its respective network.

Wireless local area network 102 may operate in any suitable mode, such as an ad-hoc or infrastructure mode, providing an independent basic service set or a basic service set, respectively. Wireless personal area network 104 can be configured as a Bluetooth™ pico-net or scatter-net for short-range communication. As shown in FIG. 1, wireless communication devices, such as smart-phone 106, may be associated with both networks and communicate with devices of each respective network.

Any of these wireless communication devices may transmit or receive packets and/or frames in accordance with various wireless networking protocols including an Institute of Electronics and Electrical Engineers (IEEE) 802.11 standard, such as 802.11g, 802.11i or 802.11n, or a short-range wireless connectivity standard such as Bluetooth™. In some instances, a wireless communication device may communicate in accordance with more than one protocol, such as smart-phone 106, which is associated with both networks of FIG. 1. For example, smart-phone 106 is capable of communicating with wireless headset 116 of wireless personal area network 104 over Bluetooth™ and with wireless printer 108 of wireless local area network 102 over IEEE 802.11n.

Figure 2:
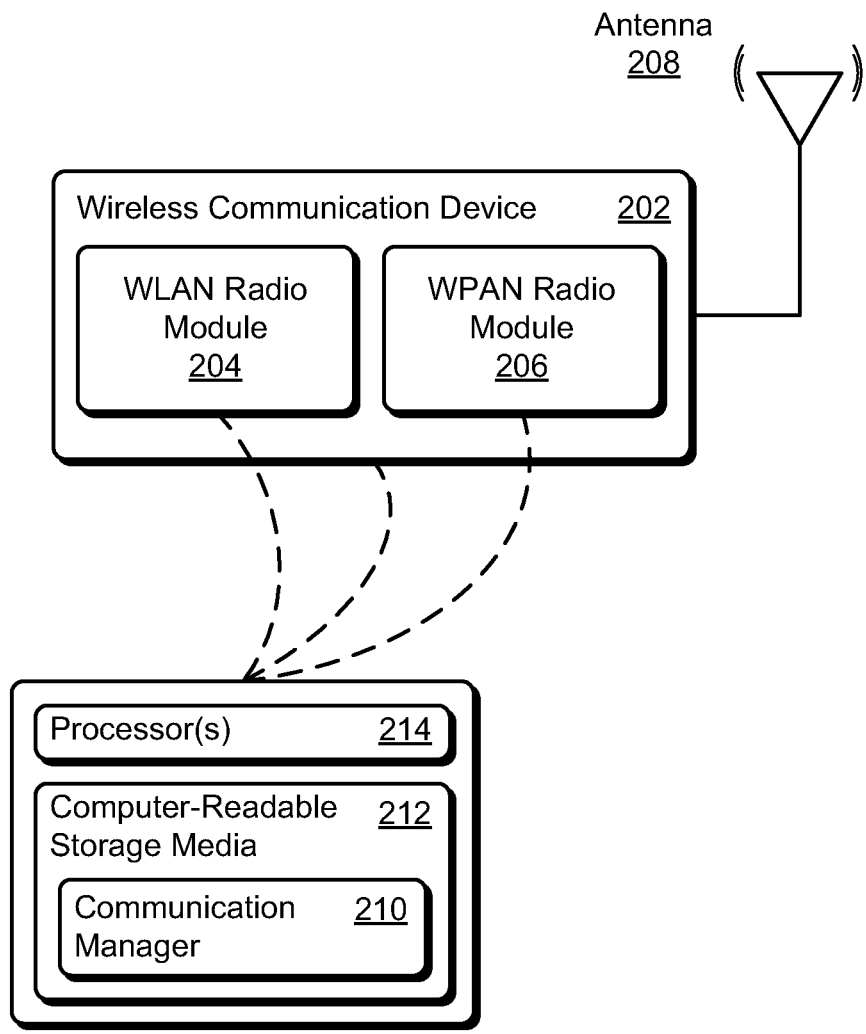
FIG. 2 illustrates a detailed aspect of an example wireless communication device shown in FIG. 1.

FIG. 2 illustrates detailed aspects of an example wireless communication device that corresponds generally to any one of the wireless communication devices shown in FIG. 1, such as smart-phone 106. As shown in FIG. 2, wireless communication device 202 includes a wireless local area network (WLAN) radio module 204 and a wireless personal area network (WPAN) radio module 206 for communicating over different wireless networks and/or protocols. Wireless communication device 202 also includes antenna 208, which WLAN radio module 204 and WPAN radio module 206 timeshare in order to communicate.

WLAN radio module 204 communicates according at any suitable local area network protocol and/or standard, such as IEEE 802.11g, 802.11i, or 802.11n. Additionally, WLAN radio module 204 can be configured as an access point (AP) implementing a WLAN network for other devices or as a WLAN station, client, or peer within a network of one or more devices. Furthermore, when configured as an AP, WLAN radio module 204 can manage a network and communications within the network by transmitting beacons to other devices, assessing channel congestion, and/or transmitting frames, such as request-to-send (RTS), clear-to-send (CTS), or CTS-to-self (CTS2Self) frames.

WPAN radio module 206 communicates according to any suitable personal area network protocol such as Bluetooth™, and may be configured as a master or slave device within a pico-net. As a master device, WPAN radio module 206 can establish a Bluetooth™ pico-net and manage traffic within the pico-net. Traffic within the pico-net includes synchronous traffic such as synchronous connection oriented (SCO) or enhanced SCO (eSCO) link traffic which consists of periodic time periods or slots for exchanging packets. Packets can be exchanged with a slave device by WPAN radio module 206 during these time slots, such as, audio, link management, or data packets.

In addition to SCO traffic, WPAN radio module 206 can communicate packets over an asynchronous connectionless link (ACL) to other devices. As a master device, WPAN radio module 206 can indicate to a slave device that asynchronous data is destined to a subsequent slave time slot. As a slave device, however, WPAN radio module 206 listens to master time slots to determine if a master device will communicate asynchronous data during the a following time slot(s). Packets exchanged during ACL exchanges can include any suitable type such as link manager protocol (LMP) packets or advanced audio distribution profile (A2DP) packets.

Antenna 208 is accessed by WLAN radio module 204 and/or WPAN radio module 206 in order to communicate. Access to antenna 208 may be via an antenna switch (not shown) or any other suitable method. WLAN radio module 204 and WPAN radio module 206 can each include a communication manager 210, which can be embodied separately or distinctly on each respective radio module. In some instances, communication manager 210 is integrated with wireless communication device 202 and communicatively coupled to either one or both radio modules and/or an antenna switch (not shown).

Communication manager 210 (in one aspect) includes a set of computer-executable instructions stored on computer-readable storage media 212. When executed by one or more processors 214, a component on which communication manager 210 is embodied acts according to those instructions. Communication manager 210 acts independently and/or in conjunction with various other entities of wireless communication device 202, such as being firmware integrated into a System-On-Chip having or communicating with WLAN radio module 204 and/or WPAN radio module 206.

Techniques of Coexisting Radio Communication

The following discussion describes techniques of coexisting radio communication. These techniques can be implemented using the previously described environment, such as by communication manager 210 of FIG. 2 embodied on WLAN radio module 204, WPAN radio module 206, and/or wireless communication device 202. These techniques include methods illustrated in FIGS. 3, 4, and 5, each of which is shown as a set of operations performed by one or more entities. These methods are not necessarily limited to the orders shown for performing the operations. Further, these methods may be used in conjunction with one another whether performed by the same entity, separate entities, or any combination thereof. In portions of the following discussion, reference will be made to operating environment 100 of FIG. 1 by way of example. Such reference is not to be taken as limited to operating environment 100 but rather as illustrative of one of a variety of examples.

Figure 3:
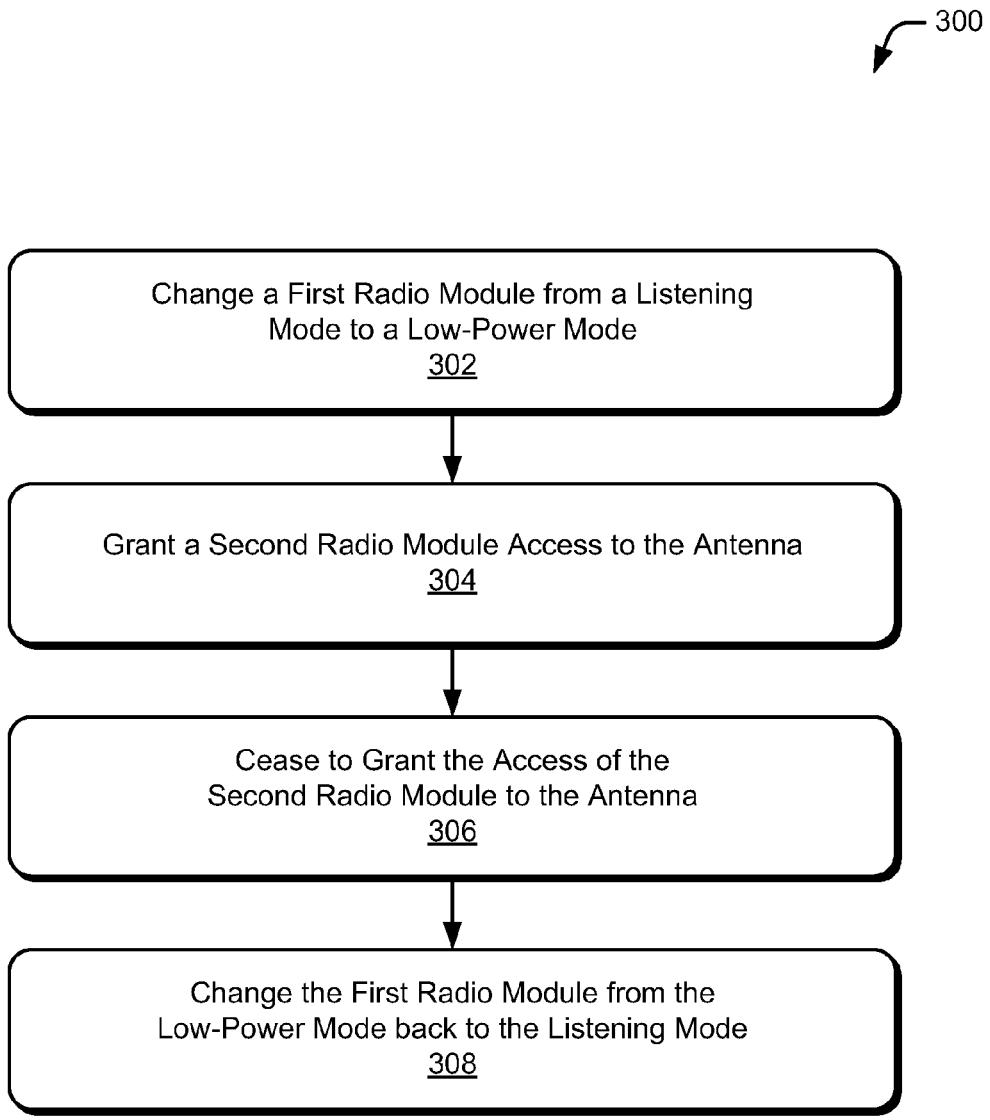
FIG. 3 illustrates a method of coexisting radio communication having a radio module changed from a listening mode to a low-power mode to prevent the radio module from using an exclusive-access period of antenna access.

FIG. 3 depicts a method 300 for coexisting radio communication, including operations performed by communication manager 210 of FIG. 2.

At 302, a first radio module is changed from a listening mode to a low-power mode. The listening mode includes alternating periods of exclusive access and nonexclusive access. During exclusive-access periods the first radio module has exclusive access to an antenna. Changing the first radio module to a low-power mode prevents the first radio module from using an exclusive-access period to obtain access to the antenna. Preventing the first radio module from using an exclusive-access period increases a nonexclusive-access period.

As an example, consider smart-phone 106 having WPAN radio module 206 configured as a Bluetooth™ slave device listening via antenna 208 for an asynchronous communication from wireless headset 116 configured as a Bluetooth™ master device. Communication manager 210 can change WPAN radio module 206 to a sniff mode, a periodic low-power mode that allows a Bluetooth™ slave device, WPAN radio module 206 in this case, to listen while in an active state. While in an inactive or low-power state, however, WPAN radio module 206 conserves power waiting until the next active state period to listen for asynchronous communication.

In some instances, parameters of the sniff mode can be configured to adjust a duty cycle of the periodic active states for a slave device. The configuration of the parameters of the sniff mode can be based on any suitable data, such as user input or an estimated bandwidth requirement for a radio. In the context of the present example, assume smart-phone 106 is receiving an audio stream that requires approximately 20% of a bandwidth available over antenna 208.

Communication manager 210 can configure parameters of the sniff mode for WPAN radio module 206 of smart-phone 106 for an active-period duty cycle for approximately 20-25% of available antenna access. Here assume an asynchronous communication cycle for WPAN radio module 206 includes 24 time slots, communication manager 210 can configure the sniff mode for an active state of six time slots and a low-power state for eighteen time slots.

At 304, a second radio module is granted access to the antenna to allow the second radio module to communicate via the antenna. The second radio module may use some or the entire amount of the increased time of a nonexclusive-access period of the first radio module. A time required for the second radio module to communicate may be more than the typical nonexclusive-access period of the first radio module, in such a case, increasing the nonexclusive-access periods of the first radio module allows the second radio module to communicate and/or complete packet exchanges.

Continuing the present example, communication manager 210 grants WLAN radio module 204 of smart-phone 106 access to antenna 208 to communicate with wireless printer 108 for the remaining 75% (18 time slots) of the bandwidth while the WPAN radio module 206 is in a low-power state of the sniff mode.

Optionally, at 306, the grant of the second radio module's access to the antenna is ceased. In some cases, the low-power mode of the first radio module may be periodic, and ceasing to grant access of the second radio module may be responsive to the first radio module exiting the low-power mode. In other cases, prior to ceasing the grant, the second radio module may transmit a protection frame, such as a CTS-to-self frame, to prevent a remote entity from transmitting a signal to the second radio module for at least a portion of a subsequent exclusive-access period of the first radio module. In such a case, the first radio module's exclusive-access periods for communication via the antenna may be limited to a certain amount of time or number of timeslots based on an effective duration of a suitable protective frame.

Continuing the present example, communication manager 210 ceases to grant WLAN radio module 204 access to antenna 208 responsive to WPAN radio module 206 exiting the low-power state of the sniff mode. WPAN radio module 206 can then listen and/or communicate with wireless headset 116 during the six time slots of the active state of the sniff mode.

Optionally, at 308, the first radio module is changed from the low-power mode back to the listening mode. Concluding the present example, communication manager 210 changes WPAN module 206 of smart-phone 106 back to an ACL communication listening mode to actively listen for asynchronous communication from wireless headset 116. Operations of blocks 302, 304, 306, and/or 308 may be repeated allowing the first and second radio modules to communicate additional data as described above.

Figure 4:
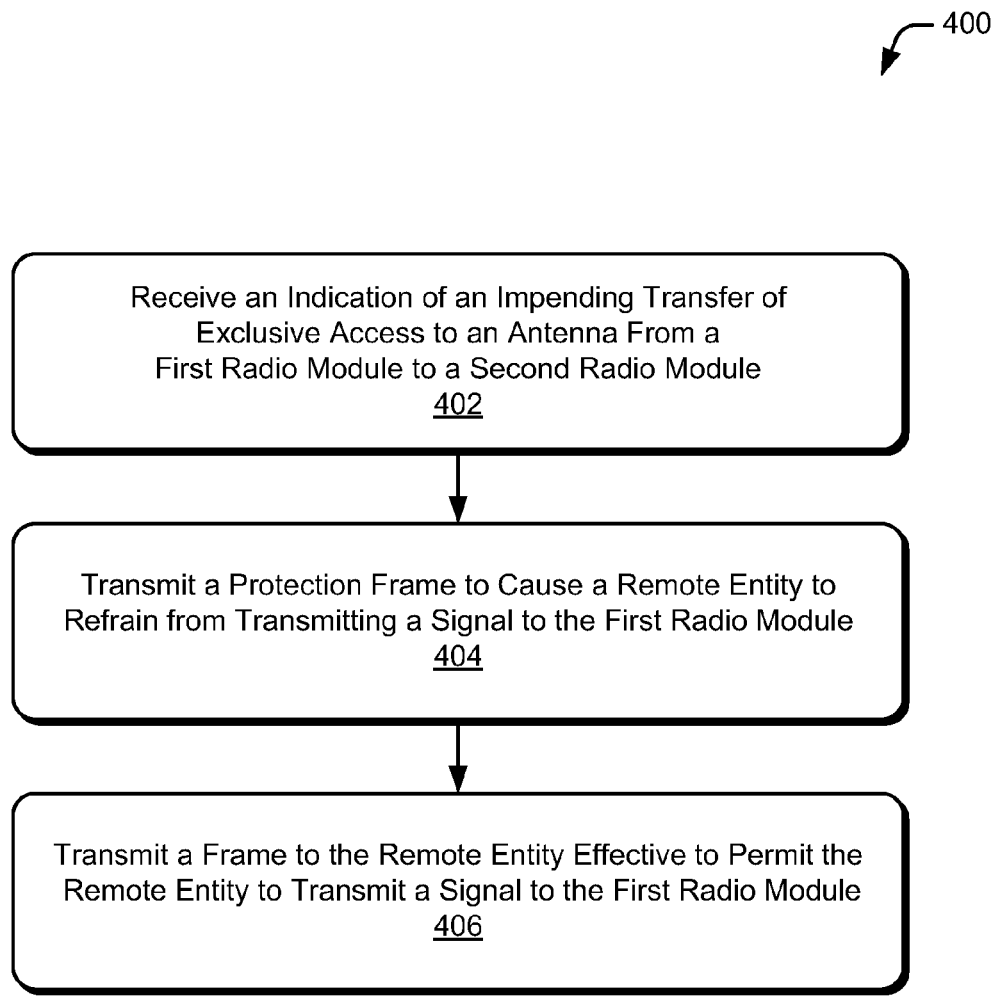
FIG. 4 illustrates a method of coexisting radio communication having a first radio module transmit a protection frame over an antenna to a remote entity before exclusive access to the antenna is transferred to a second radio module.

FIG. 4 depicts a method 400 for coexisting radio communication, including operations performed by communication manager 210 of FIG. 2.

At 402, an indication of an impending transfer of exclusive access to an antenna currently held by a first radio module to a second radio module is received. The indication may also indicate an amount of time that exclusive access is to be held by the second radio module. This indication may be received from the second radio module, which is preparing to communicate during a synchronous period. For example, a WPAN radio module 206 of smart-phone 106 may indicate to communication manager 210 a SCO period of 1.25 ms is approaching.

At 404, a protection frame is transmitted to a remote entity that is capable of transmitting a signal to the first radio module. In some cases, the protection frame is effective to cause the remote entity to refrain from transmitting a signal to the first radio module during the second radio module's exclusive access. The protection frame can be any suitable frame or combination of frames, such as a CTS-to-self, RTS and/or CTS frame(s).

Parameters of the protection frame can be based on the amount of time that exclusive access to the antenna is to be held by the second radio module. For instance, a CTS-to-self frame may indicate a length of time that corresponds to a period of Bluetooth SCO traffic, effective to prevent remote WLAN devices from transmitting during Bluetooth communications.

In some instances, the first radio may transmit data after transmission of the protection frame until the start of the second radio module's exclusive access to increase throughput. Data frames transmitted after the protection frame can be transmitted using point coordination function inter-frame spacing (PIFS) or without back-off. In some cases, the transmitted data frames may carry remaining protection time of the transmitted protection frame. Alternately or additionally, the transmitted data frames may carry an expiry value ending the data transmission before the second radio module's exclusive access.

While exclusive access to the antenna is held by the second radio module, the first radio module may be set to a low-power mode. Additionally or alternatively, the first radio module can compress data queued for transmission for the amount of time that exclusive access is held by the second radio module. Continuing the present example, communication manager 210 can cause WLAN radio module 204 to transmit a CTS-to-self frame indicating 1.25 ms of medium unavailability to wireless printer 108 to prevent wireless printer 108 from transmitting during the SCO period of WPAN radio module 206. Additionally, communication manager 210 can set WLAN radio module 204 to a low-power state during the SCO period of WPAN module 206 to conserve power.

Optionally, at 406, a frame is transmitted to a remote entity effective to allow the remote entity to communicate with the first radio module. Any suitable frame may be transmitted such as, for example, a contention-free end (CF-End) frame. Transmitting the frame to allow the remote entity to communicate may be responsive to determining that the second radio module has ceased holding exclusive access to the antenna. Concluding the present example, communication manager 210 causes WLAN radio module 204 to transmit a CF-End frame to wireless printer 108, allowing communication to resume. The operations of blocks 402, 404, and 406 may be repeated allowing both radio modules to communicate additional data.

Figure 5:
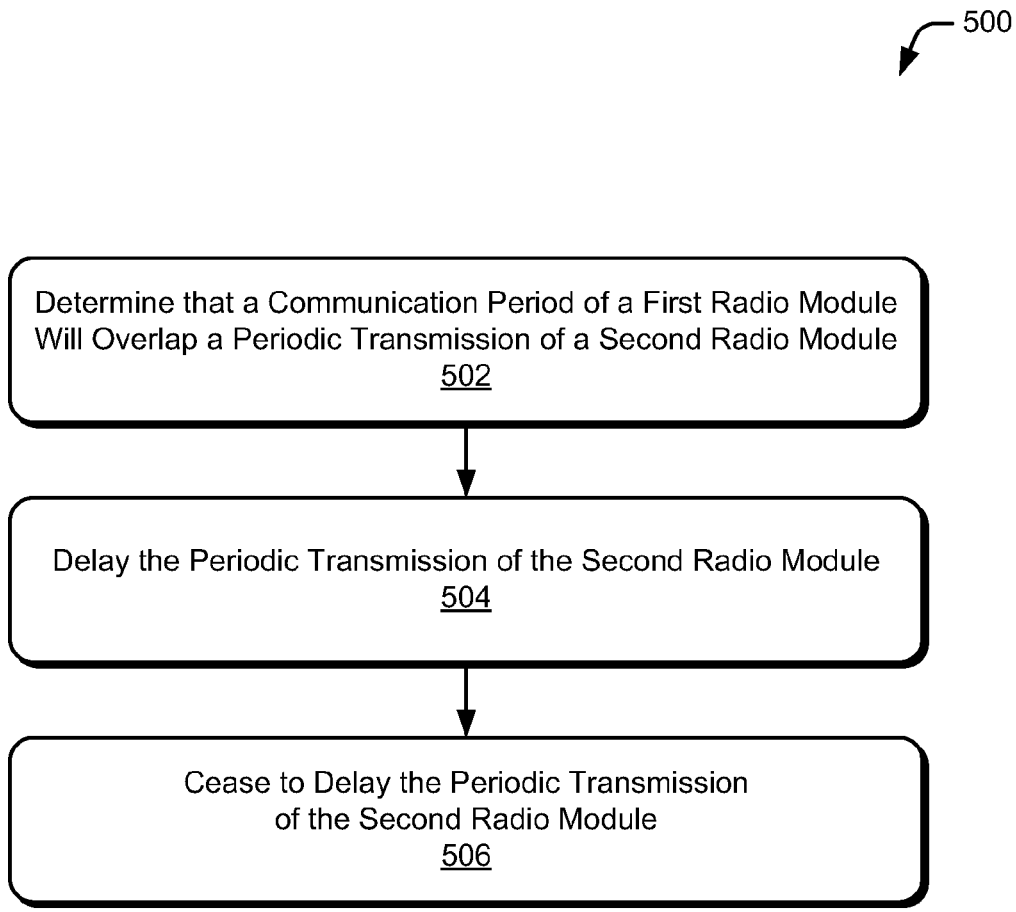
FIG. 5 illustrates a method of coexisting radio communication for delaying a periodic transmission of a radio module.

FIG. 5 depicts a method 500 for coexisting radio communication, including operations performed by communication manager 210 of FIG. 2.

At 502, it is determined that a communication period of a first radio module will overlap a periodic transmission of a second radio module. In some instances, alternating communication and non-communication periods of the first radio module are not synchronized with periodic transmissions of the second radio module. Or the communication period may be a synchronous communication period, such as a period for SCO or eSCO traffic. Additionally, the periodic transmission can be a beacon transmission for a WLAN network scheduled for a target beacon transmission time (TBTT). In this case, communication manager 210 may determine that a SCO period of WPAN radio module 206 will overlap a TBTT of WLAN radio module 204.

At 504, the periodic transmission of the second radio module is delayed until after the communication period of the first radio module. Delaying the periodic transmission can be responsive to determining that the communication period of the first radio module will overlap the periodic transmission of the second radio module. In some instances, a signal can be asserted to the second radio module effective to delay the periodic transmission. The asserted signal may indicate that a communication channel or medium is restricted, such as a clear channel assessment (CCA) signal. In the context of the present example, communication manager 210 asserts a CCA signal of WLAN radio module 204 to delay transmission of the beacon scheduled for the TBTT until after the SCO period of WPAN radio module 206.

At 506, delaying the periodic transmission of the second radio module is ceased to allow the second radio module to transmit. Ceasing to delay the periodic transmission is responsive to the communication period of the first radio module ending or to a time-out period lapsing. Ceasing to delay the periodic transmission can include ceasing to assert a signal to the second radio module such as, for example, the CCA signal as described above. Concluding the present example, communication manager ceases to assert the CCA signal to WLAN module 204 to allow transmission of the beacon after the SCO period of WPAN radio module 206. The operations of blocks 502, 504, and 506 may be repeated allowing both radio modules to communicate additional data.

System-on-Chip

Figure 6:
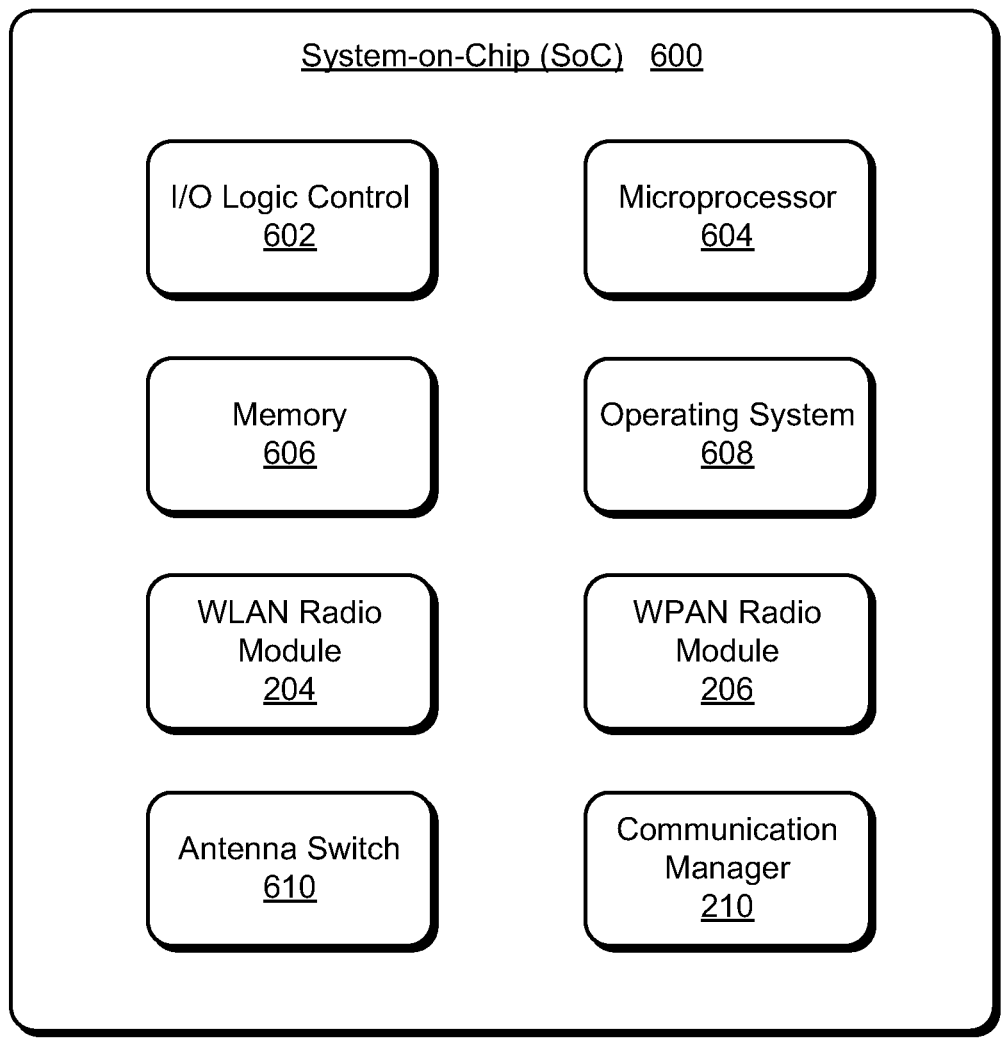
FIG. 6 illustrates a System-on-Chip (SoC) environment for implementing aspects of the techniques described herein.

FIG. 6 illustrates a System-on-Chip (SoC) 600, which can implement various embodiments described above. A SoC can be implemented in a fixed or mobile device, such as a computing device, game console, camera, wireless printer, wireless headset, smart phone, digital video recorder, picture frame, set-top box, and/or any other type of device that may communicate with multiple wireless networks.

SoC 600 can be integrated with electronic circuitry, a microprocessor, memory, input-output (I/O) logic control, communication interfaces and components, other hardware, firmware, and/or software needed to run an entire device. SoC 600 can also include an integrated data bus (not shown) that couples the various components of the SoC for data communication between the components. A wireless communication device that includes SoC 600 can also be implemented with many combinations of differing components.

In this example, SoC 600 includes various components such as an input-output (I/O) logic control 602 (e.g., to include electronic circuitry) and a microprocessor 604 (e.g., any of a microcontroller or digital signal processor). SoC 600 also includes a memory 606, which can be any type of random access memory (RAM), a low-latency nonvolatile memory (e.g., flash memory), read only memory (ROM), and/or other suitable electronic data storage. SoC 600 can also include various firmware and/or software, such as an operating system 608, which can be computer-executable instructions maintained by memory 606 and executed by microprocessor 604. SoC 600 can also include other various communication interfaces and components, wireless communication components, other hardware, firmware, and/or software.

SoC 600 also includes WLAN radio module 204, WPAN radio module 206, and communication manager 210. Examples of these various components, functions, and/or entities, and their corresponding functionality, are described with reference to the respective components of the environment 100 shown in FIG. 1. Soc 600 can also include an antenna switch 610 to allow WLAN radio module 204 and WPAN radio module 206 to timeshare access to an antenna or other medium.

Communication manager 210 in SoC 600, either independently or in combination with other entities, can be implemented as computer-executable instructions maintained by memory 606 and executed by microprocessor 604 to implement various embodiments and/or features described herein. Communication manager 210 may also be provided integral with other entities of the SoC, such as integrated with one or both of WLAN radio module 204 and/or WPAN radio module 206, antenna switch 610, or an arbiter module (not shown). Alternatively or additionally, communication manager 210 and the other components can be implemented as hardware, firmware, fixed logic circuitry, or any combination thereof that is implemented in connection with the I/O logic control 602 and/or other signal processing and control circuits of SoC 600.

Although the subject matter has been described in language specific to structural features and/or methodological operations, the subject matter defined in the appended claims is not necessarily limited to the specific features or operations described above, including orders in which they are performed.

What is claimed is:

1. A system-on-chip comprising:
a first radio module having a periodic listening mode for asynchronous communication, each cycle of the periodic listening mode having time slots that are each configurable as an active time slot effective to enable asynchronous communication or an inactive time slot effective to prevent asynchronous communication, the time slots of the periodic listening mode being configurable as a duty cycle of consecutive active time slots and consecutive inactive time slots, the first radio module having exclusive access to an antenna during the active time slots and having non-exclusive access to the antenna during the inactive time slots;
a second radio module configured to communicate via the antenna when the first radio module does not have exclusive access; and
a communication manager configured to:
determine that an estimated bandwidth requirement of the first radio module as a percentage of total available antenna access during one cycle of the periodic listening mode is approximately twenty-five percent of a bandwidth available over the antenna,
set parameters of the consecutive active time slots and consecutive inactive time slots based on the determined percentage of total available antenna access during one cycle of the periodic listening mode required by the first radio module being approximately twenty-five percent of a bandwidth available over the antenna effective to establish the duty cycle of the periodic listening mode,
configure at least two consecutive time slots of the periodic listening mode as inactive time slots effective to prevent the first radio module from having exclusive access to the antenna for at least the two consecutive time slots of the periodic listening mode, and
grant the second radio module access to the antenna for at least a portion of the two consecutive time slots for which the first radio module does not have exclusive access to the antenna.

2. The system-on-chip of claim 1, wherein one of the time slots of the periodic listening mode is an insufficient amount of time for the second radio module to complete a packet exchange.

3. The system-on-chip of claim 1, wherein the first radio module enters an inactive state or sleep state during the inactive time slots of the periodic listening mode and the communication manager is further configured to cease to grant the second radio module access to the antenna responsive to the first radio module exiting the inactive state or sleep state.

4. The system-on-chip of claim 1, wherein the communication manager is further configured to cause the second radio module to transmit a protection frame to a remote entity effective to prevent the remote entity from transmitting a signal to the second radio module for at least a portion of a time that exclusive access to the antenna is to be held by the first radio module.

5. The system-on-chip of claim 1, wherein each time slot of the periodic listening mode includes a same amount of time.

6. The system-on-chip of claim 1, wherein the communication manager is further configured to configure at least three consecutive time slots of the periodic listening mode as inactive time slots effective to prevent the first radio module from having exclusive access to the antenna for at least the three consecutive of the time slots.

7. The system-on-chip of claim 1, wherein each cycle of the periodic listening mode is configured to include at least two active time slots for asynchronous communication.

8. The system-on-chip of claim 1, wherein the first radio module is configured to communicate according to a short-range wireless connectivity standard and the second radio module is configured to communicate according to an Institute of Electrical and Electronics Engineers 802.11 standard.

9. The system-on-chip of claim 1, wherein the communication manager is further configured to:
receive an indication of an impending transfer of exclusive access to the first radio module via the antenna while the antenna is currently held by the second radio module, the indication including a first amount of time exclusive access is anticipated to be held by the first radio module; and
cause, responsive to receiving the indication and before the transfer of exclusive access, the second radio module to transmit a protection frame over the antenna to a remote entity to cause the remote entity to refrain from transmitting a radio signal to the second radio module for a second amount of time based on the first amount of time exclusive access is anticipated to be held by the first radio module.

10. The system-on-chip of claim 9, wherein the communication manager is further configured to transmit, responsive to determining that the first radio module has ceased holding exclusive access to the antenna, a frame to the remote entity effective to permit the remote entity to transmit to the second radio module.

11. The system-on-chip of claim 9, wherein the communication manager is further configured to cause the second radio module to transmit at least one data frame after transmission of the protection frame and prior to transferring exclusive antenna access to the first radio module.

12. The system-on-chip of claim 9, wherein the communication manager is further configured to instruct the second radio module to compress data queued for transmission while exclusive access is held by the first radio module.

13. The system-on-chip of claim 9, further comprising adjusting a data communication rate of the second radio module effective to prevent communications of the second radio module from overlapping with the amount of time exclusive access is held by the first radio module.

14. A method comprising:
configuring a first radio module having a periodic listening mode to an inactive state for at least two consecutive time slots of the periodic listening mode, each cycle of the periodic listening mode having time slots during which the first radio module is configurable as active to enable asynchronous communication or inactive effective to prevent asynchronous communication, the time slots of the periodic listening mode being configurable as a duty cycle of consecutive time slots during which the first radio module is active and consecutive time slots during which the first radio module is inactive, the first radio module having exclusive access to an antenna when configured to be active and having non-exclusive access to the antenna when configured to be inactive;
determining that an estimated bandwidth requirement of the first radio module as a fraction of total available antenna access during one cycle of the periodic listening mode is approximately one quarter of a bandwidth available over the antenna;
setting parameters of the duty cycle of the periodic listening mode based on the fraction of total available antenna access during one cycle of the periodic listening mode determined to be the estimated data throughput rate requirement of the first radio module being approximately one quarter of a bandwidth available over the antenna; and
granting a second radio module access to the antenna for at least a portion of the two consecutive time slots for which the first radio module is configured to the inactive state effective to enable the second radio module to communicate a packet exchange.

15. The method of claim 14, wherein one of the time slots of the periodic listening mode is an insufficient amount of time for the second radio module to complete the packet exchange.

16. The method of claim 14, further comprising, after the at least two consecutive time slots elapse, ceasing to grant the second radio module access to the antenna.

17. The method of claim 14, further comprising causing the first radio module to share the parameters of the duty cycle of the periodic listening mode with a remote entity effective to prevent the remote entity from attempting to initiate asynchronous communication with the first radio module during the consecutive inactive time slots.

18. The method of claim 14, wherein the method is performed by the second radio module, an arbiter module, or an antenna switch.

19. The method of claim 14, wherein the first radio module is configured to communicate according to a short-range wireless connectivity standard and the second radio module is configured to communicate according to an Institute of Electrical and Electronics Engineers 802.11 standard.

20. The system-on-chip of claim 1, wherein each cycle of the periodic listening mode includes twenty-four time slots, and the duty cycle of the periodic listening mode of the first radio module is set to be six consecutive active time slots based on the determined estimated bandwidth requirement for the first radio module being approximately twenty-five percent.

* * * * *